United States Patent [19]

Dibenedetto

[11] 3,727,025
[45] Apr. 10, 1973

[54] METHOD FOR WELDING VERTICALLY EXTENDING PIPE SECTIONS TOGETHER

[75] Inventor: Anthony J. Dibenedetto, Metairie, La.

[73] Assignee: Rig Hammers, Inc., Westwego, La.

[22] Filed: Mar. 24, 1970

[21] Appl. No.: 22,161

Related U.S. Application Data

[63] Continuation-in-part of Ser. No. 828,409, April 4, 1969, abandoned.

[52] U.S. Cl. ...................... 219/73, 219/60 A, 219/61
[51] Int. Cl. ......................................... B23k 9/18
[58] Field of Search .................... 219/73, 60 A, 61

[56] References Cited

UNITED STATES PATENTS 2,960,597  11/1960  Bruno et al. .................... 219/60 A X
2,795,689  7/1957  McNutt ........................... 219/60 A X
3,035,159  5/1962  DeVille et al. .................. 219/73 X
1,643,227  9/1927  Stresau ........................... 219/61
2,956,147  10/1960  Baker ............................ 219/60 A X
2,678,987  5/1954  Talley ............................ 219/73 X
3,193,656  7/1965  Bell et al. ....................... 219/60 A Primary Examiner—R. F. Staubly
Assistant Examiner—Gale R. Peterson
Attorney—Birch, Swindler, McKie & Beckett

[57] ABSTRACT

A method for welding substantially vertically extending pipe sections together in end-to-end relationship, wherein at least one of the adjacent ends of the sections is bevelled to provide a welding space between the sections, and a means for depositing weld metal is moved about the sections to deposit weld metal in such space while all of the welding parameters are controlled and maintained irrespective of environmental-induced movements of the sections.

4 Claims, 16 Drawing Figures

INVENTOR
Anthony J. Di Benedetto

BY Irons, Birch, Swindler & McKie
ATTORNEYS

INVENTOR
Anthony J. DiBenedetto

BY
ATTORNEYS.

INVENTOR
Anthony J. DiBenedetto

INVENTOR
Anthony J. DiBenedetto

3,727,025

METHOD FOR WELDING VERTICALLY EXTENDING PIPE SECTIONS TOGETHER

RELATED APPLICATION

This application is a continuation-in-part application of application Ser. No. 828,409, filed Apr. 4, 1969, now abandoned.

BACKGROUND OF THE INVENTION

1. Field of the Invention

This invention relates to a method and apparatus for welding pipe sections together, and specifically for welding substantially vertically extending pipe sections together in end-to-end relationship.

2. Description of the Prior Art

The drilling of wells frequently requires that a length of pipe be inserted into the earth for isolating at least the upper portion of a well from the surrounding environment to prevent both the materials introduced into the well, i.e., drilling mud and cement, and the materials removed from the well, i.e., petroleum, gas and water, from escaping into and contaminating the surrounding environment. A length of pipe of this type, known in the art as conductor pipe, is required for an offshore petroleum well to prevent contamination of the enironment surrounding the well and the loss of valuable petroleum.

In order to drill an offshore well, a substantial length of conductor pipe must extend from a drilling rig, through the water beneath the rig to the ocean floor, and into the ocean floor a substantial distance. Also, the conductor pipe is of relatively large diameter, i.e. a diameter of two feet or greater.

The conductor pipe usually is transported to the rig in relatively short sections, i.e. sections of 40 feet in length, which sections are sequentially welded together in end-to-end relationship as the pipe is intermittently inserted through the water and into the ocean floor. Until now the methods employed for welding substantially vertically extending pipe sections together, i.e. sections of conductor pipe, have been conventional manual methods. Such methods have proved less than satisfactory for offshore operations for several reasons. First, manual welding methods are relatively slow and therefore prolong the period required to install the conductor pipe. Since the equipment employed in offshore operations is relatively expensive to operate and maintain, any reduction of the time required to install the conductor pipe represents a corresponding reduction of operation and maintenance expenses. Second, manual welding methods do not produce welds of uniform high quality, particularly when the welders are required to work for extended periods of time. Also, the wind and wave action characteristic of the environment of an offshore well imposes severe bending forces on the conductor pipe. Thus, low quality welds are susceptible to failure which can impair the success of the entire drilling operation. Third, since the welds produced by manual welding methods are not of uniform high quality, frequently such welds must be cut out and replaced, further prolonging the period required to install the conductor pipe.

SUMMARY OF THE INVENTION

The present invention obviates the foregoing problems by providing a method and apparatus for welding substantially vertically extending pipe sections together relatively quickly with welds of uniform high quality. Moreover, the method and apparatus of the invention are unaffected by the environment of an offshore drilling operation.

Basically described, the apparatus of the invention comprises; at least one welding unit including a movable carriage, means for supporting the carriage for movement about two substantially vertically extending adjacent pipe sections, means mounted on the carriage for moving the carriage about the pipe sections, and means mounted on the carriage for depositing weld metal; and a positioning unit removably connected to the supporting means for supporting and positioning the welding unit, particularly during mounting and demounting of the welding unit about the pipe sections.

Preferably, the depositing means deposits beads of weld metal utilizing a conventional deposition technique, such as the submerged arc or open arc technique.

Basically described, the method of the invention comprises; forming a bevel at one end of at least one of two pipe sections to be joined in end-to-end relationship, said bevel extending from the inner surface to the outer surface of said one section and being inclined toward the other end of said one section; placing the sections in a substantially vertically extending position with said one end of said one section disposed adjacent one end of the other section to form a space between said adjacent one ends; moving a means for depositing weld metal about the sections to deposit weld metal in said space beginning at the inner surfaces of the sections and working progressively therearound and outwardly to fill the space with weld metal, while maintaining a controlled separation between the depositing means and the weld metal deposited thereby and the base metal of the pipe sections and a controlled attitude of the depositing means with respect to the weld metal deposited thereby and the base metal of the depositing means irrespective of environmental-induced movements of the sections; and controlling the physical characteristics of the said deposited weld metal by regulating only one of the deposition parameters of the depositing means.

If desired, a backing strip may be positioned around the inner surfaces of the pipe sections at the juncture between the adjacent ends thereof to facilitate alignment of the sections.

Also, the pipe sections may be joined by means of a plate individually welded to each section. The use of such a plate eliminates the need for a welding space between the adjacent ends of the sections.

With the foregoing in mind, it is an object of the present invention to provide an improved method and apparatus for welding substantially vertically extending pipe sections together.

It is a further object of the invention to provide a method and apparatus for welding substantially vertically extending pipe sections together relatively quickly, which method and apparatus are unaffected by environmental-induced movements of the sections.

It is another object of the invention to provide an apparatus for welding substantially vertically extending pipe sections together, which apparatus includes means for depositing weld metal in a space defined between the adjacent ends of such sections and a positioning unit for positioning the depositing means in the proper position for depositing weld metal in such space.

It is also an object of the invention to provide an apparatus as described in the preceding object, which apparatus further includes a welding unit for controlling the separation between the depositing means and the weld metal deposited thereby and the attitude of the depositing means with respect to the weld metal deposited thereby.

It is a further object of the invention to provide a method and apparatus for welding substantially vertically extending pipe sections together in which all except one of the weld metal deposition parameters are held constant and control of the physical characteristics of the deposited weld metal beads is effected by varying such one parameter.

These and other objects of the invention will become apparent upon a consideration of the detailed description of the preferred embodiments thereof given in connection with the following drawings.

DESCRIPTION OF THE PREFERRED EMBODIMENTS

Figure 1:
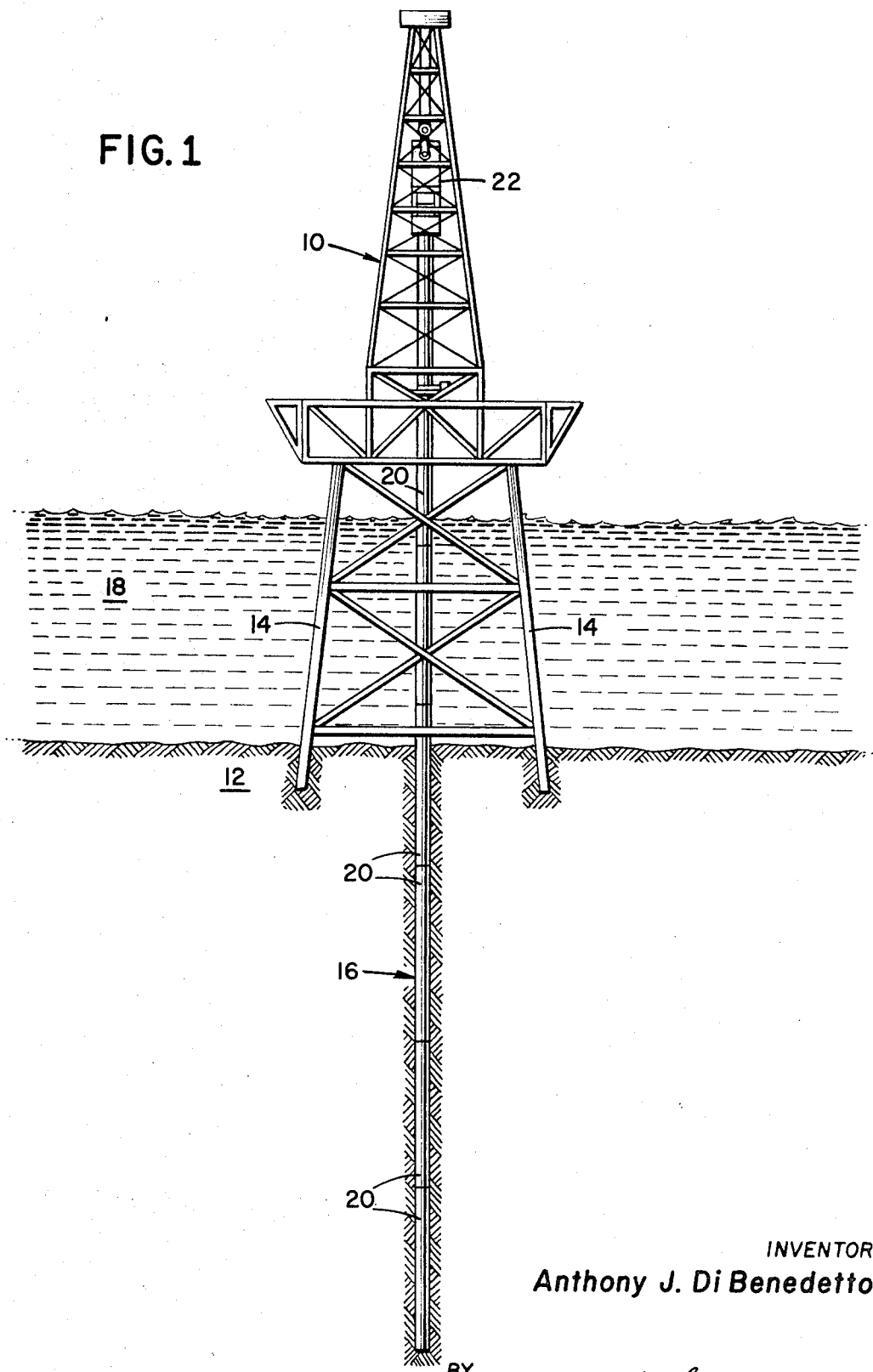
FIG. 1 is a diagramatic view of an offshore drilling rig showing the relationship between the conductor pipe and the rig, the water beneath the rig and the ocean floor.

An offshore drilling rig is shown in FIG. 1, as designated by reference numeral 10. Rig 10 is positioned for drilling a petroleum well in the ocean floor 12, and is secured to floor 12 by a plurality of legs 14 anchored therein. Preparatory to drilling the well a length of conductor pipe 16 must be inserted from the rig through the water 18 beneath the rig to floor 12 and into floor 12 a substantial distance. The conductor pipe serves as a structural conduit through which the materials employed in drilling the well, i.e., drilling mud and cement, are introduced into the well, thus preventing such materials from escaping into and contaminating the environment surround the well. Also, after the well has been drilled, the conductor pipe serves as the outer structural member of a conduit through which petroleum and other materials are received from the well, thus similarly preventing such latter materials from escaping into and contaminating the surrounding environment, as well as preventing the loss of petroleum and other valuable materials, i.e., gas, received from the well.

The conductor pipe is transported to the site of rig 10 in relatively short sections 20. Generally, sections 20 are 40 feet in length. Sections 20 are sequentially welded together in end-to-end relationship to form the length of conductor pipe 16 required. After each section 20 has been welded to the length of conductor pipe already extending downwardly from the rig, the conductor pipe is inserted downwardly the length of the just-added section. This process is repeated until the lower end of the conductor pipe has reached the desired depth. A rig hammer 22 is employed for driving the conductor pipe into ocean floor 12.

As will be apparent from this brief description, one of the important factors which determines the period of time required to install conductor pipe 16 is the time required for welding tgether adjacent sections 20. Conventional manual welding methods have been employed to accomplish this function. Such methods severely impair the efficiency of the drilling operation for several reasons.

First, the weld metal deposition rate of manual welding methods is relatively low, for example, 6 pounds of weld metal per man-hour. Also, the conductor pipe generally is of relatively large diameter, frequently exceeding a diameter of two feet and ocassionally being of a diameter of 6 feet. Thus, considerable time is consumed in welding together the conductor pipe sections utilizing manual welding methods. This factor, coupled with the fact that the equipment employed in offshore drilling operations is relatively expensive to operate and maintain, results insignificant expenses being attributable to the use of manual welding methods.

Second, the personnel employed for performing such manual welding methods frequently are required to work for extended periods of time due to the economic necessity of installing the conductor pipe as quickly as possible. Such personnel are therefore subject to fatigue, resulting in decreases in both the uniformity and quality of the welds produced. This factor, coupled with the fact that the wind and wave action characteristic of the environment of an offshore well imposes severe bending loads on the conductor pipe, results in the susceptibility of such low quality welds to failure, jeopardizing the success of the entire drilling operation.

Third, due to the severe bending loads imposed on the conductor pipe by the surrounding environment, the welds between adjacent sections of the pipe are nearly always inspected for quality. Low quality welds, if discovered, are required to be cut out and replaced, further prolonging the period of time required to install the conductor pipe and resulting in increased expenses.

Figure 2:
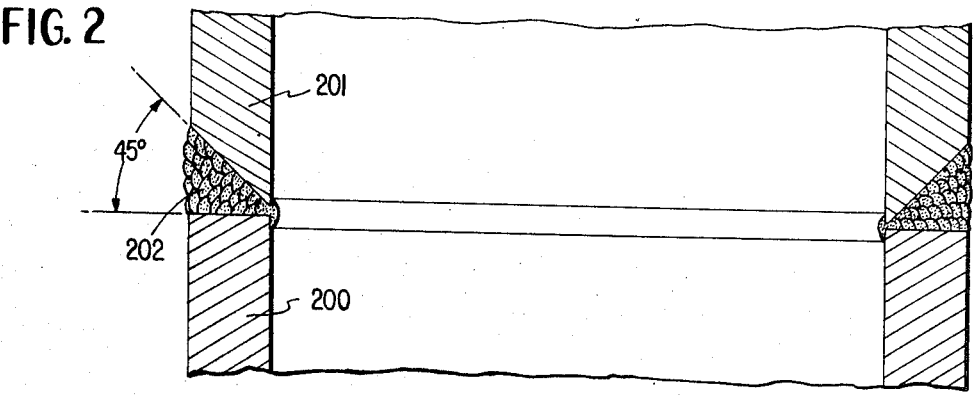
FIG. 2 is a sectional view of two substantially vertically extending adjacent pipe sections, showing one type of welding space which may be employed with this invention.
Figure 3:
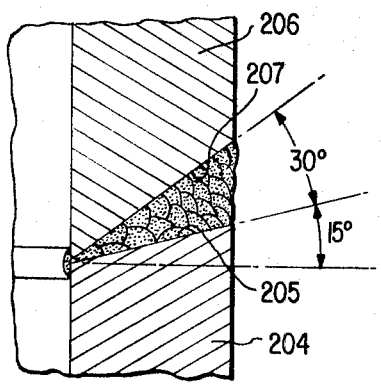
FIG. 3 is a sectional view of another type of welding space which may be employed with this invention.
Figure 5:
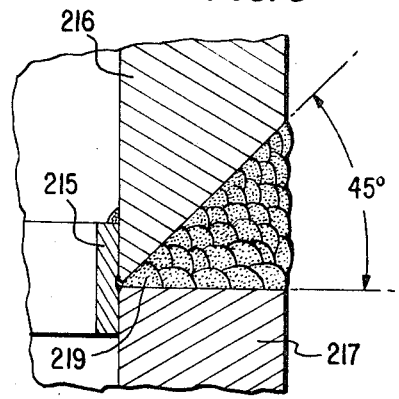
FIG. 5 is a sectional view showing a backing strip that may be employed with this invention.
Figure 4:
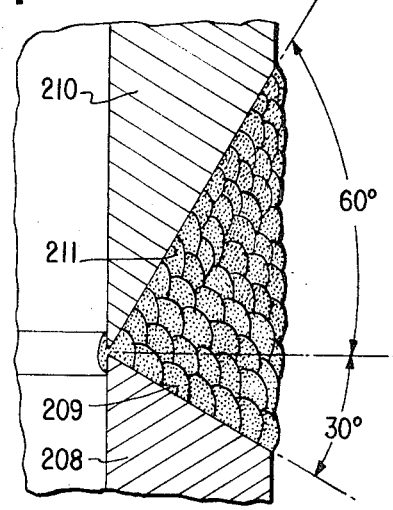
FIG. 4 is a sectional view of still another type of welding space which may be employed with this invention.
Figure 6:
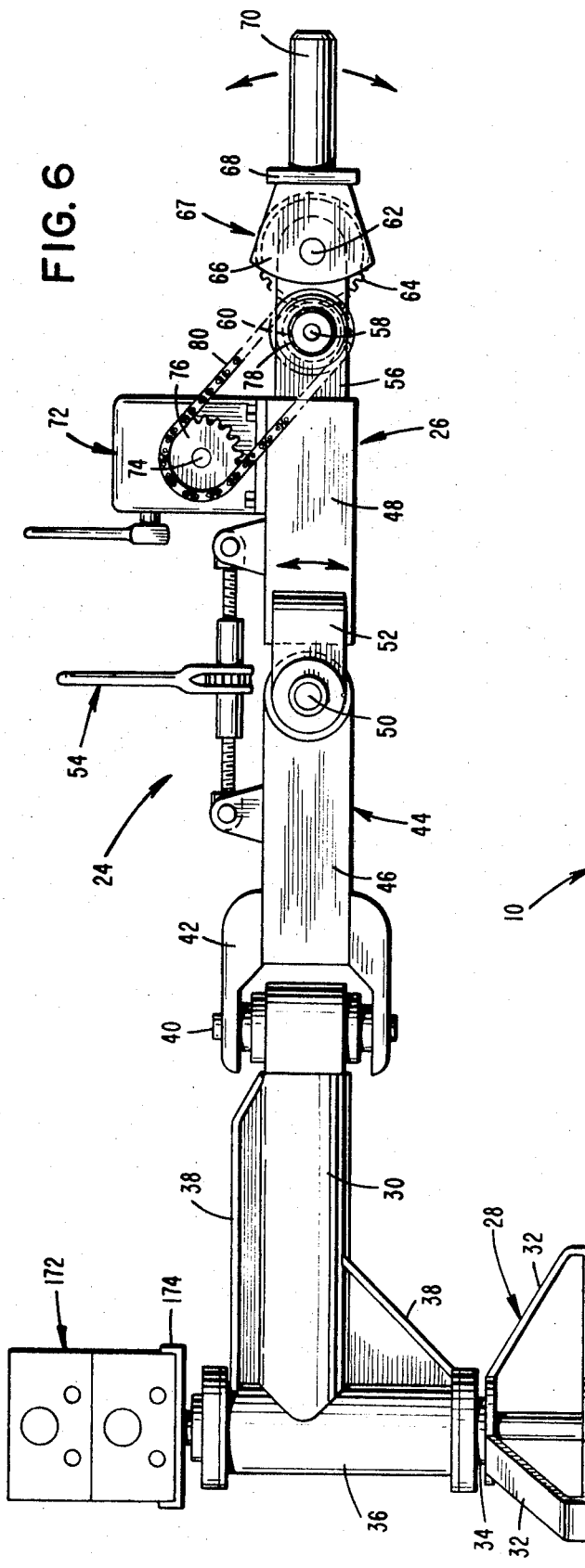
FIG. 6 is an elevational view of the positioning unit of a first embodiment of the apparatus of this invention.
Figure 7:
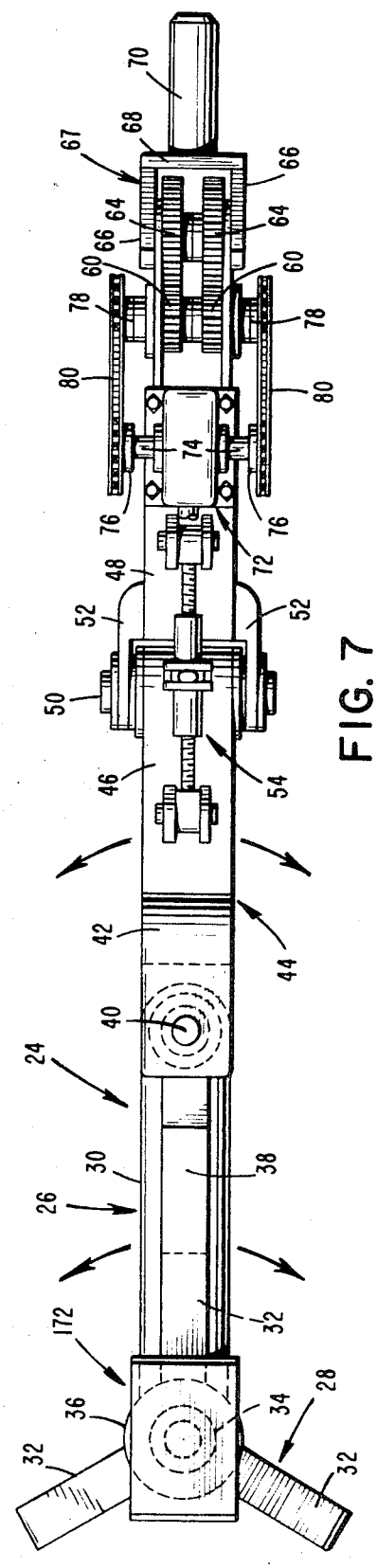
FIG. 7 is a plan view of the positioning unit shown in FIG. 6.

The method and apparatus of the instant invention permit welds of uniform high quality to be obtained and, in addition, due to the precisely controlled operation thereof, permit relatively high weld metal deposition rates to be employed, for example, twenty pounds of weld metal per hour of operation with a single welding unit. Thus, this invention overcomes the economic and quality deficiencies of the welding methods and apparatus advanced by the prior art. The invention lends itself well to virtually any type of weld space configuration which is generally used in the field, such as those illustrated in FIGS. 2–5. For example, in FIG. 2 there is shown in cross-section a first pipe section 200 and a second pipe section 201 which have been welded together in end-to-end relationship. In this type of weld space, the upper end of section 200 is squared off to form an angular planar surface oriented substantially perpendicular to the longitudinal axis of the section. Pipe section 201 terminates in a bevel forming a conical surface inclined inwardly and downwardly at an angle of approximately 45° to the longitudinal axis of the section. Before welding, the sections are vertically aligned with each other such that the bevelled end of section 201 forms a weld groove into which weld metal 202 is deposited. FIG. 3 illustrates another weld groove in which the upper portion of a lower pipe section 204 has a bevelled surface 205 inclined inwardly at an angle of approximately 15° to a plane perpendicular to the longitudinal axis of the section, while the lower end of an upper pipe section 206 has a bevelled surface 207 inclined outwardly at an angle of approximately 45° to the longitudinal axis of the pipe section. Bevelled surfaces 205 and 207 cooperate to form a downwardly oriented welding groove having an angular entrance of 30°. FIG. 4 shows another weld groove defined by a lower pipe section 208 having an outwardly inclined bevelled surface 209 at an angle of approximately 30° to a plane perpendicular to the longitudinal axis of section 208, and an upper pipe section 210 having an outwardly inclined bevelled surface at an angle of approximately 60° to a plane perpendicular to the longitudinal axis of section 210. To facilitate the alignment of two substantially vertically extending adjacent pipe sections to be welded together, a backing strip may be positioned around the inner surfaces of the sections at the welding space defined between the adjacent ends thereof. An example of a backing strip that may be employed with this invention is shown in FIG. 5, as designated by reference numeral 215. Backing strip 215 comprises a relatively short cylindrical metallic strip which is adapted to be positioned around the inner surfaces of two pipe sections 216 and 217. Backing strip 215 is normally attached to the inner surface of upper pipe section 216 by means such as a fillet weld, and extends outwardly beyond the bevelled end 218 of such section. Backing strip 215 facilitates the alignment of the pipe sections when upper pipe section 216 is lowered into end-to-end relationship with lower pipe section 217, and becomes an integral part of the welding as the first welding bead 219 or root pass is deposited.

A first embodiment of the apparatus of this invention is shown in FIGS. 6 through 11 and includes a positioning unit 24. Unit 24 comprises an articulated arm 26 and connecting means 28 for connecting the arm to a platform or to the floor of drilling rig 10. To facilitate the description of arm 26, the end of the arm nearest connecting means 28 will be referred to as the inner end. Also, a similar reference system will be used in describing the various components of arm 26 and the relationships therebetween.

Connecting means 28 includes a base 32 that can be affixed to the rig floor by any suitable means, such as by welding or spiking, if such fixed attachment is desired. A substantially vertically extending shaft 34 is affixed to the top of base 32, and a sleeve 36 is rotatably mounted thereon.

Arm 26 includes an elongated member 30, the inner end of which is affixed to sleeve 36 and which is thus pivotally movable with respect to base 32 about the substantially vertical axis of shaft 34. Suitable flanges 38 are connected to member 30 and sleeve 36 to strengthen the affixation of the inner end of the former to the latter.

A substantially vertically extending shaft 40 is carried by the outer end of member 30. A yoke 42 is pivotally mounted on shaft 40 and is fixedly attached to the inner end of a beam 44. Beam 44 is thus pivotally movable with respect to member 30 about the substantially vertical axis of shaft 40.

Beam 44 comprises an inner beam section 46 and an outer beam section 48. A substantially horizontally extending shaft 50 is carried by the outer end of section 46. A yoke 52 is pivotally mounted on shaft 50 and is fixedly attached to the inner end of beam section 48. Beam section 48 is thus pivotally movable with respect to beam section 46 about the substantially horizontal axis of shaft 50 so that the outer end of section 48 may be raised and lowered with respect to section 46.

Means are connected to beam sections 46 and 48 for adjusting the vertical position of the outer end of section 48 with respect to section 46. Such means may comprise a ratchet-actuated turnbuckle mechanism 54, or an hydraulic or pneumatic mechanism. By manipulating mechanism 54, the outer end of section 48 may be moved to a particular vertical position with respect to section 46 and locked in that position.

Fixed to the outer end of beam section 48 are a pair of parallel plates 56. A substantially horizontally extending shaft 58 is journalled in the medial portions of plates 56. Secured to shaft 58 interiorly of plates 56 are a first pair of gears 60. Another substantially horizontally extending shaft 62 is journalled in the outer portions of plates 56. Secured to shaft 62 interiorly of plates 56 are a second pair of gears 64 meshing with gears 60. Also affixed to shaft 62 are a pair of ears 66 which are disposed parallel to and exteriorly of plates 56. A plate 68 interconnects ears 66 and forms with the ears a yoke 67.

The inner end of a shaft 70 is connected to plate 68. The inner end of shaft 70 is thus pivotally connected to the outer end of beam section 48 by yoke 67, shaft 62, gears 64, gears 60, shaft 58, and plates 56 for pivotal movement of the shaft with respect to beam 44 about the substantially horizontal axis of shaft 62.

Means are also provided for adjusting the pivotal attitude of shaft 70 with respect to beam 44 about the axis of shaft 62. As illustrated in the first embodiment of the invention, such means can comprise a ratchet-actuated transmission 72 having a pair of identically driven output shafts 74. Secured to shafts 74 are a pair of sprockets 76 which are drivingly connected to a corresponding pair of sprockets 78 by a pair of chains 80. Sprockets 78 are secured to shaft 58 so that when output shafts 74 are rotated, gears 60 and 64 will be caused to rotate, thus changing the pivotal attitude of shaft 70 with respect to beam 44 about the axis of shaft 62. Shafts 74 also may be disengaged from the driving elements of transmission 72 so that shaft 70 is freely pivotable with respect to beam 44 about the axis of shaft 62.

A sleeve 82 is rotatably mounted on shaft 70 for rotation about the axis thereof. Sleeve 82 may be secured to shaft 70 by a set screw 84.

As will be apparent from the foregoing description, when shafts 74 are disengaged from the driving elements of transmission 72 and set screw 84 is disengaged from shaft 70, and shaft 70 is substantially horizontally oriented, sleeve 82 is rotatable with respect to the inner end of member 30 about three mutually perpendicular axes, namely, the substantially vertical axis of shaft 40 and the substantially horizontal axes of shafts 50 and 70. Moreover, arm 26 is rotatable with respect to the floor of rig 10 about the substantially vertical axis of shaft 34.

The first embodiment of the apparatus of the invention also includes a welding unit 86. Welding unit 86 includes a movable carriage 88 and a means for supporting carriage 88 for movement about two substantially vertically extending adjacent pipe sections to be welded together, and particularly two adjacent conductor pipe sections 20. The supporting means comprises a split ring 90 formed by two arcuate channel members 92 and 94 which are pivotally interconnected by a hinge 96. Members 92 and 94 are adapted to be positioned about the lower of the two sections 20 to be welded together and releasably locked together by a quick-release latch 98.

Ring 90 is secured to the lower section 20 by a plurality of clamping bolts 100. Bolts 100 threadably engage nuts 102 and 104 affixed to the inner and outer lateral sides, respectively, of channel members 92 and 94 interiorly of the members. Rotatably attached to the inner end of each bolt 100 is a clamping die 106 adapted to engage the outer surface of the lower section 20.

Integrally affixed to the top of members 92 and 94 is a flange 108 having a rectangular bead 110 at the top thereof. Carriage 88 is supported for movement about sections 20 on the upper surfaces of members 92 and 94. The carriage includes an open-bottomed base 112 to which are connected a forward wheel 114 and a rear wheel 116 which are adapted to contact the upper surfaces of members 92 and 94 outside flange 108. Also connected to base 112 is an intermediate wheel 118 which is adapted to contact the upper surfaces of members 92 and 94 inside flange 108. In addition, a pair of guide wheels 120 and 122 are mounted on the underside of the top of carriage base 112 and engage bead 110 on either side thereof.

Welding unit 86 also includes means mounted on carriage 88 for moving the carriage about sections 20. In this first embodiment a friction drive arrangement is illustrated, although other types can be used. Direct gear drive is herein illustrated with regard to the second embodiment of the invention. The carriage drive means can include an electric motor 124 which is drivingly connected to a speed reduction unit 126. Secured to the output shaft of unit 126 is a resilient capstan roller 128 which is adapted to frictionally engage the inner surface of bead 110 for moving carriage 88 and the components of welding unit 86 mounted thereon about sections 20.

Motor 124 is attached to a plate 130 and the latter is pivotally mounted on the upper surface of carriage base 112. A handwheel operated adjustment mechanism 132 is connected to plate 130 and base 112 for pivoting motor 124, speed reduction unit 126 and roller 128 with respect to the base, so that roller 128 may be firmly engaged with the inner surface of bead 110.

Also mounted on carriage base 112 is a means for depositing weld metal in a welding space 134 defined between the adjacent ends of sections 20. The depositing means may utilize any conventional weld metal deposition technique, for example open arc, submerged arc, shielded arc, gas or atomic-hydrogen. The depositing means of the first embodiment of the apparatus utilizes are open arc technique and includes a reel 136 on which is wound a roll of electrode wire 138. Reel 136 is mounted on carriage base 112 for rotation about a substantially vertical axis by a shaft 140. From reel 136, wire 138 is inserted into a conventional wire feed mechanism 142. Mechanism 142 includes an electric motor 144 which is drivingly connected to a pair of wire feed rolls (not shown) by a speed reduction unit 146. The wire feed wheels feed wire 138 through a wire nozzle 148. Nozzle 148 positions the wire for deposition into space 134.

Mechanically interposed between wire feed mechanism 142 and carriage base 112 is a means for adjusting the horizontal position of nozzle 148. Such means comprises a plate 150 which is slidably mounted on the upper surface of base 112 and a handwheel operated adjustment mechanism 152 connected to plate 150 and base 112 for adjusting the horizontal position of the plate. Wire feed motor 144 is attached to the upper surface of plate 250 so that the wire feed mechanism 142 is movable with the plate.

Also mounted on carriage 88 is a means for adjusting the vertical attitude of nozzle 148. Such means comprises a housing 154 which encloses the wire feed rolls of mechanism 142 and to which nozzle 148 is attached.

Housing 154 is rotatably mounted on a flange disposed about the wire feed rolls and may be locked in position by a clamping bolt 156. By rotating housing 154, the vertical attitude of nozzle 148 may be adjusted.

By combining a horizontal position adjustment, effected by manipulating mechanism 152, with a vertical attitude adjustment, effected by rotating housing 154, it is further possible to adjust the vertical position of nozzle 148.

Also, mounted on carriage 88 is a means for adjusting the horizontal attitude of nozzle 148. For this purpose, plate 150 is adjustably pivotally mounted on the upper surface of carriage base 112 so that the horizontal attitude of mechanism 142, including nozzle 148, may be adjusted.

The separation between electrode wire 138 and the previously deposited weld metal and the base metal of sections 20 is an important parameter in controlling the characteristics of the weld metal beads. Generally, it is desirable to keep this separation substantially constant, and thus welding unit 86 includes means for compensating for out of round pipe sections. For example, if the lower pipe section 20 is out of round, the aforementioned separation will vary unless means to change the horizontal position of mechanism 142 is provided.

For this purpose, welding unit 86 additionally includes a compensating means mounted on carriage 88 for sensing irregularities in the shape of the lower section 20 and changing the horizontal position of nozzle 148 in response to any such irregularities, so that the separation between the nozzle and the previously deposited weld metal and the base metal of sections 20 will remain substantially constant for any adjusted position of plate 150. Such compensating means comprises a spring-biased roller mechanism 157. Mechanism 157 includes a roller 158 which is mounted at the inner end of an arm 160 and which contacts the outer surface of the lower section 20 just below the welding space 134. Arm 160 is spring-biased inwardly toward the lower section 20 so that roller 158 remains in contact with the section irrespective of any irregularities in the shape thereof. The outer end of arm 160 is operatively connected to plate 150 by any conventional mechanical linkage so that arm 160 and plate 150 will be horizontally displaced in response to any irregularities in the shape of the lower section 20. Thus, the separation between nozzle 148 and the previously deposited weld metal and the base metal of sections 20 will remain constant for any adjusted position of plate 150.

While in the first embodiment of the apparatus the various means for adjusting the position of nozzle 148 comprise conventional mechanical linkage systems, any one or more of such systems may be replaced by more sophisticated electro-mechanical systems.

Welding unit 86 additionally includes means for supplying electrical current to motors 124 and 144 and for establishing a welding arc between electrode wire 138 and the adjacent ends of sections 20. Such means include a strip of insulation 162 affixed to the inner side of flange 108. Three vertically superposed bus bars 164 are affixed to the inner side of strip 162 and are contacted by three correspondingly vertically superposed brushes 166. Brushes 166 are carried by a flange 168 affixed to the underside of the top of carriage base 112. Leads 170 are connected between brushes 166 and motors 124 and 144 and a suitable contact device contacting wire 138. The lower section 20 serves as a common ground for motors 124 and 144 as well as for the welding arc.

An objective of this invention is to provide a method and apparatus for welding pipe sections together under operating and environmental conditions which are quite harsh. As a key factor in accomplishing this objective, the instant invention proposed to hold constant all save one of the parameters which affect the physical characteristics of the weld metal beads, i.e., the size, shape, and temperature of the beads, and regulating only such one parameter to control the welding process. This greatly simplifies the task of the operator, allowing him to observe the progress of the welding, and make adjustments by varying only one control. The principal parameters of the welding process are voltage and current to the weld metal depositing means, separation between the welding wire and the base metal and deposited weld metal, attitude of the welding wire with respect to the base metal and deposited weld metal, welding wire feed rate, and velocity of the depositing means. The most efficient control of the bead characteristics is provided by regulating the velocity of the depositing means. However, the invention is not limited to control of this parameter alone.

Suitable controls 172 for regulating the speed of motors 124 and 144 conveniently are mounted on a pedestal 174 affixed to the top of shaft 34. Also, suitable controls (not shown) for regulating the welding voltage and current are provided at a convenient location in the vicinity of controls 172. By adjusting controls 172 and the welding voltage and current controls, the weld metal deposition rate and bead characteristics may be accurately controlled. As indicated above, it has been found that the most efficient control of the bead characteristics is provided by regulating the speed of motor 124.

Figure 8:
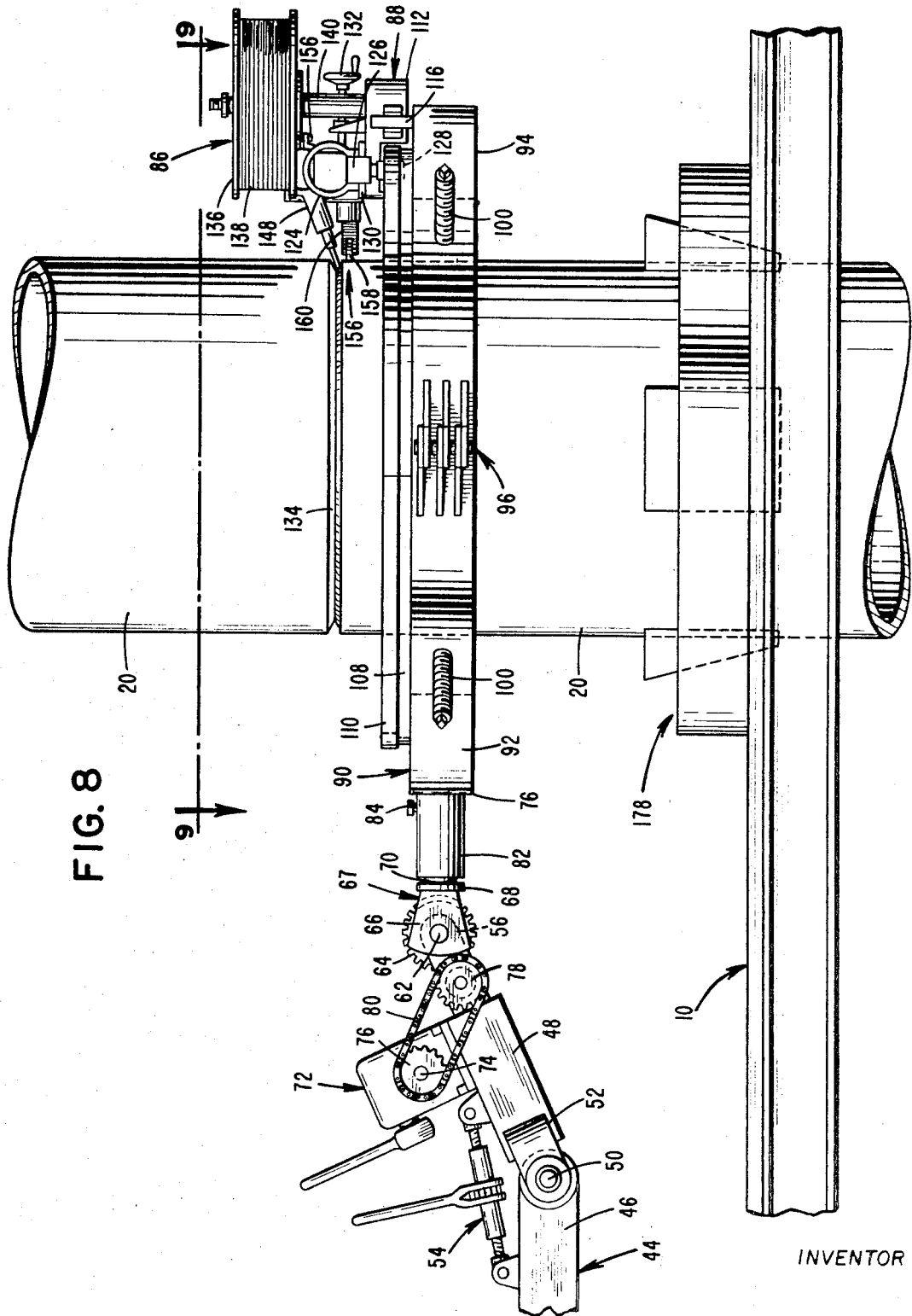
FIG. 8 is an elevational view of a portion of the positioning unit of the first embodiment of the apparatus of this invention, and the welding unit of such embodiment positioned for welding together two substantially vertically extending adjacent pipe sections.
Figure 9:
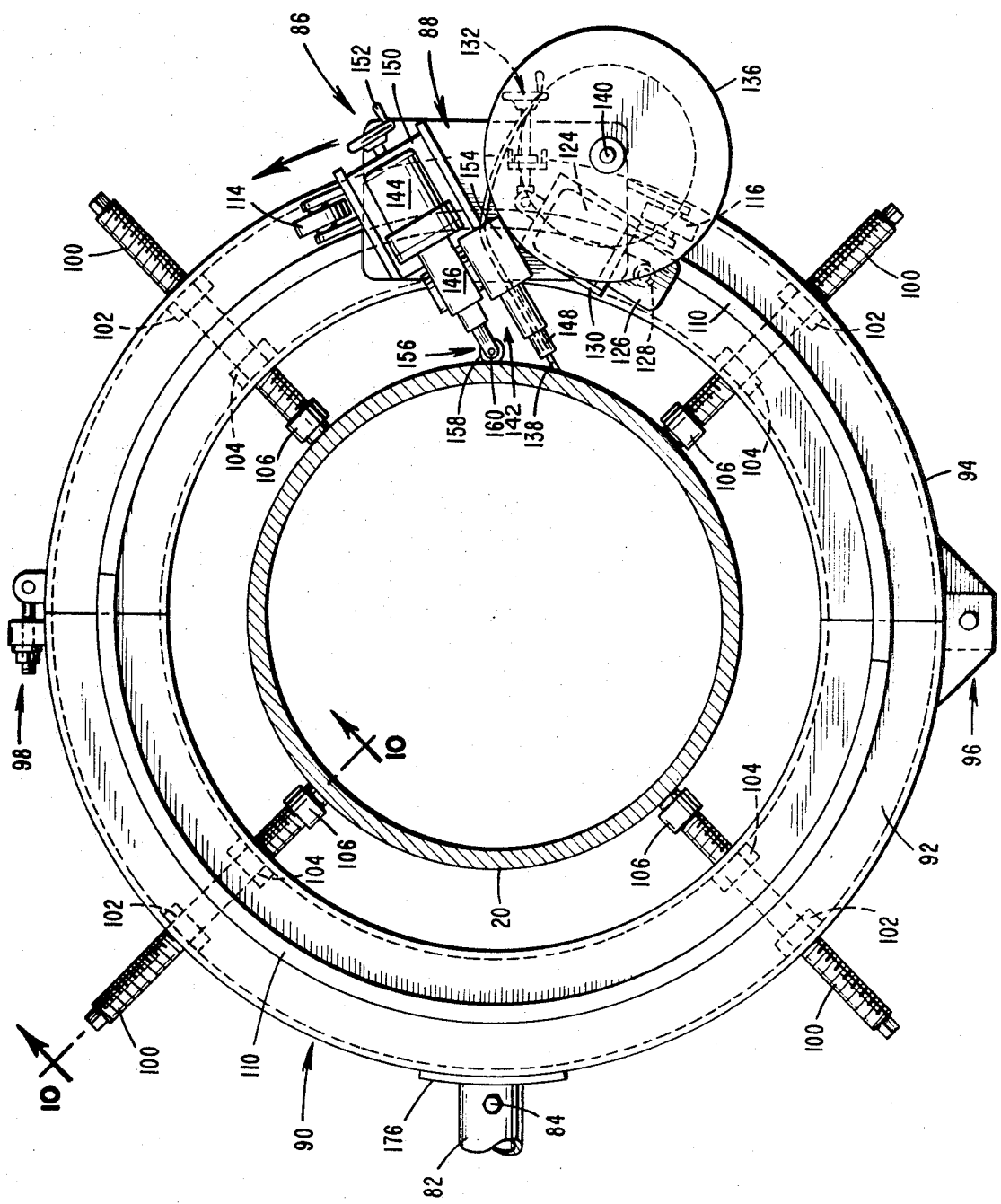
FIG. 9 is a sectional view taken on line 9—9 of FIG. 8.
Figure 10:
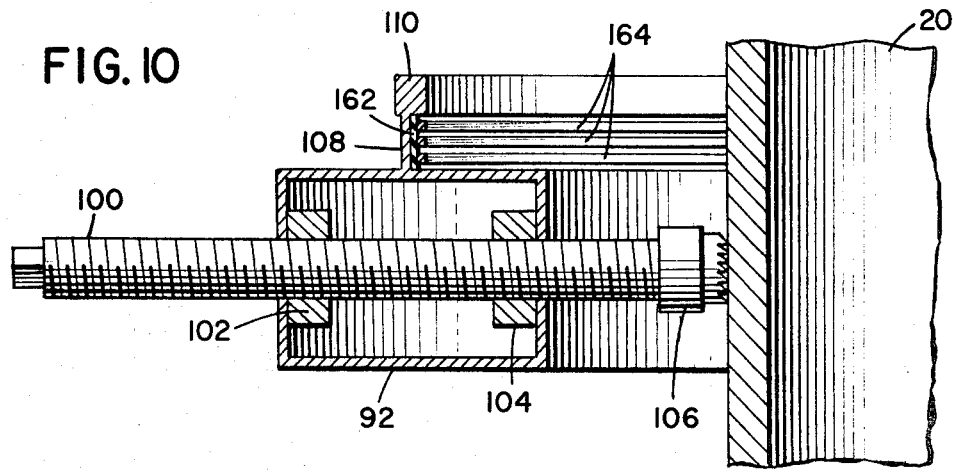
FIG. 10 is a sectional view taken on line 10—10 of FIG. 9.
Figure 11:
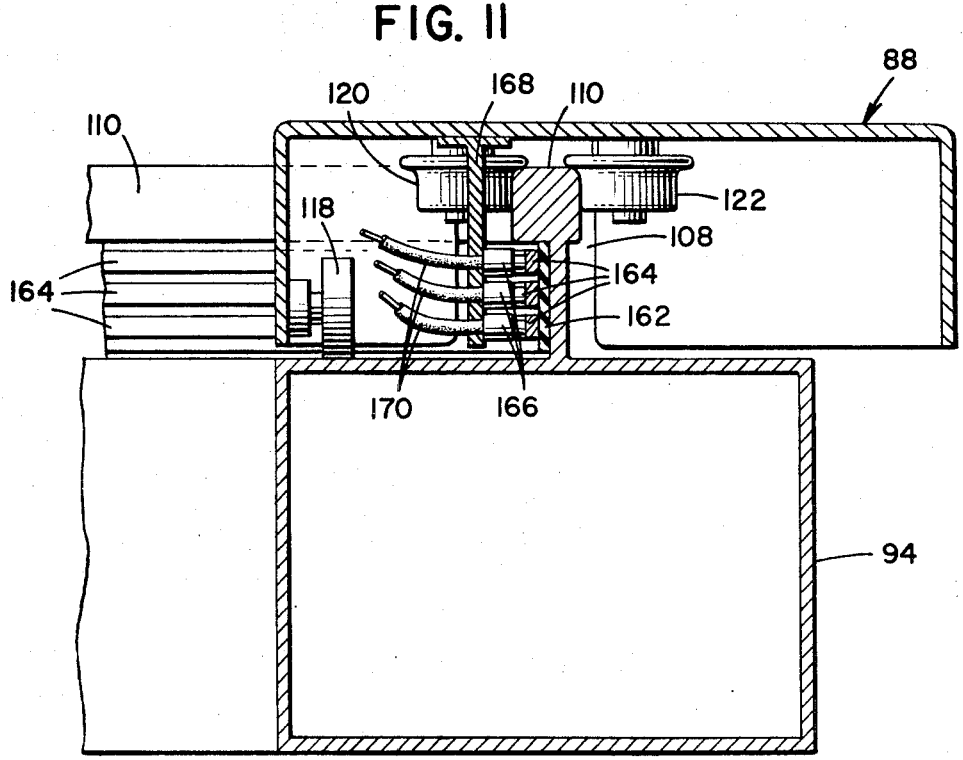
FIG. 11 is an enlarged sectional view of a portion of the welding unit of the first embodiment of the apparatus of this invention.

The outer end of arm 26 is connected to ring 90 for positioning welding unit 86 in the proper position for butt welding pipe sections 20 together. Specifically, the outer end of sleeve 82 is affixed to a plate 176, and the latter is affixed to the outer lateral side of channel member 92 exteriorly of the member. To position ring 90, shafts 74 are engaged with the driving elements of transmission 72 and sleeve 82 is rotated about shaft 70 until ring 90 is substantially coplanar with shaft 62 after which set screw 84 is engaged with shaft 70. Mechanism 54 is then manipulated until the components of the apparatus outboard of beam section 48 are raised or lowered to the proper vertical position. Transmission 72 is then actuated until the components of the apparatus outboard of beam section 48 are positioned in a substantially horizontal plane, as shown in FIG. 8. Channel member 94 is then pivoted about hinge 96 to position channel members 92 and 94 about the lower section 20, and the channel members are secured together by latch 98. Clamping bolts 100 are then screwed inwardly until clamping dies 106 securely engage the outer surface of the lower section 20, with ring 90 being concentrically disposed thereabout, as shown in FIG. 9. Output shafts 74 are then disengaged from shaft 70 so that ring 90 is pivotally movable with respect to the inner end of arm 26 about the same three mutually perpendicular axis as is sleeve 82, as described above. Alternatively, if desired for ease of access to carriage 88 in all rotational positions of the carriage about sections 20, shaft 70 may be removed from sleeve 82, and arm 26 pivoted away from unit 86 during the welding operation.

The lower section 20 and the length of conductor pipe 16 extending downwardly therefrom is supported by any suitable means, such as a ring and wedge assembly 178. Before the lower end of the conductor pipe has reached ocean floor 12, assembly 178 provides both vertical and lateral support for the pipe. After the lower end of the conductor pipe had reached the ocean floor, assembly 178 provides only lateral support for the pipe. Due to the wind and wave action acting on the conductor pipe, particularly before the lower end thereof has reached the ocean floor, the upper end of the lower section 20 is caused to move and rock about with respect to assembly 278 and rig 10. However, irrespective of the environmental-induced movements of the lower section 20, the controlled separation, both horizontal and vertical, between nozzle 148 and the deposited weld metal and the base metal of sections 20, and the controlled attitude, both horizontal and vertical, of nozzle 148 with respect to such deposited and base metal, as established by the various adjustment mechanisms mounted on carriage 88, will not be affected by such movements. Therefore, the deposition of weld metal in space 134 also will be unaffected by such movements, permitting welds of uniform high quality to be obtained.

Also, base 32 and assembly 178 are horizontally separated by a distance less than the full horizontal extent of arm 26 so that the outer end of arm 26 may be horizontally displaced with respect to shaft 34 by the combined pivotal movements of member 30 about the axis of shaft 34 and beam 44 about axis of shaft 40. Thus, any horizontal displacement of the upper end of the lower section 20 caused by an environmental-induced movement of the section does not affect the controlled relationship between ring 90 and arm 26. If welding unit 86 is disconnected from arm 26 during the welding operation, as described above, the arm will be unaffected by movements of lower section 20.

Normally, carriage 88 orbits sections 20 several times to complete the weld between the adjacent ends thereof. During such orbits a plurality of weld metal beads are formed in welding space 34. During each orbit the operator can continuously observe the physical appearance of the weld bead, and can vary the controls from their initial settings, if necessary, to insure that the bead has the desired characteristics. Preferably, as above explained, only one control is adjusted.

Figure 12:
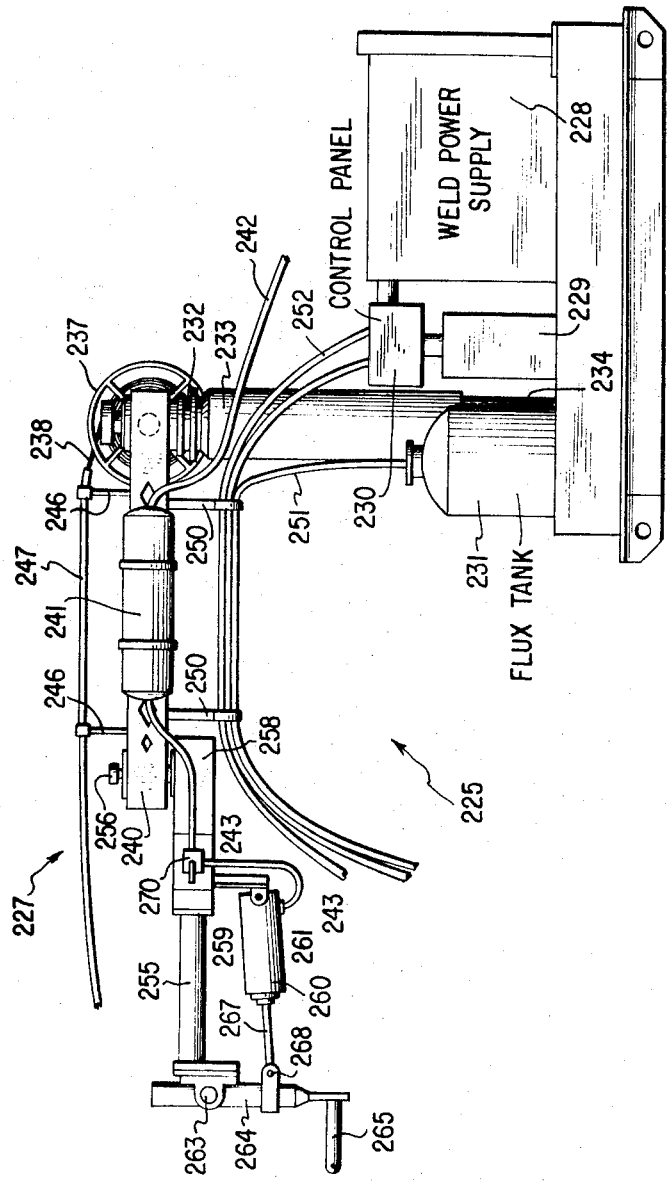
FIG. 12 is an elevational view of a second embodiment of the apparatus of this invention.
Figures 13, 14:
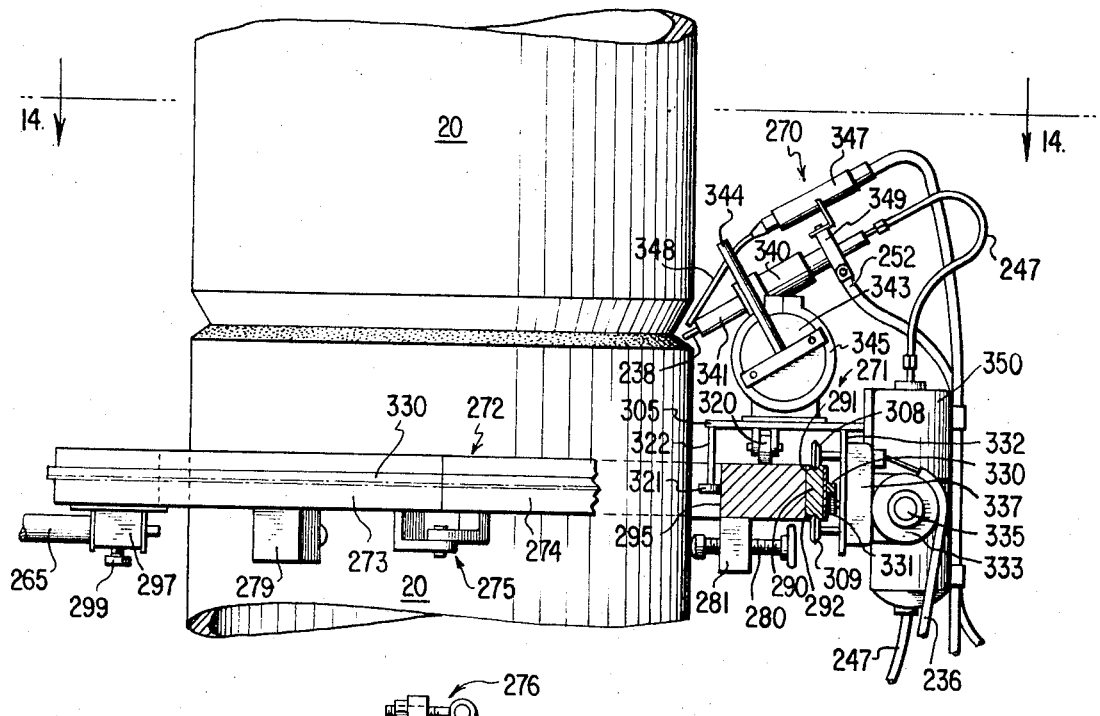
FIG. 13 is an elevational view of the welding unit of the second embodiment of the apparatus of this invention, showing the welding unit positioned for welding together two substantially vertically extending adjacent pipe sections.
FIG. 14 is a sectional view taken on line 14—14 of FIG. 13.

A second embodiment of the apparatus of the invention is illustrated in FIGS. 12–14, and includes a positioning unit 225. Unit 225 includes a base 226 and an articulated arm 227. Base 226 provides a firm footing for positioning unit 225, as well as providing a foundation for the support equipment necessary to operate the apparatus. Such support equipment includes a welding power supply 228, a fuse panel 229 and a control panel 230. Also positioned on base 226 are a flux tank 231, and conventional means for supplying compressed air and hydraulic power (not shown).

A substantially vertically extending post 232 is attached to base 226. Post 232 includes a cylindrical sleeve 233 and a piston 234 disposed within the sleeve. Piston 234 extends downwardly from the lower end of sleeve 233 and is affixed to base 226. Sleeve 233 may be raised and lowered on piston 234 by a conventional hydraulic motor and control unit (not shown). Also, sleeve 233 is rotatable about piston 234.

Mounted on the upper portion of post 232 is a reel 237 on which is wound a roll of welding wire 238. Arm 227 comprises an elongated member 240 which is connected at its inner end to the top of post 232 and which thus is movable in a substantially horizontal plane about the axis of piston 234. Attached to member 240 is a compressed air accumulator 241 having an inlet line 242 from an air compressor (not shown) and an outlet line 243. Also mounted on member 240 by means of supports 246 is a conduit 247 through which welding wire 238 is fed to a welding unit hereinafter described. Brackets 250 are also mounted on member 240, providing support for a flux supply conduit 251, which conducts flux from flux tank 231 to the welding unit, and a plurality of control and power supply cables 252 leading from control panel 230 to the welding unit.

A beam 255 is pivotally connected to the outer end of member 240 by a vertically extending pin 256. Beam 255 is movable about the axis of pin 256 in a plane parallel to the plane in which member 240 is movable. Beam 255 includes an inner beam section 258 to which is attached a bracket 259. Bracket 259 supports a pneumatic actuator 260 by means of a connecting pin and bracket assembly 261. Beam 255 also includes an outer beam section 221 having an attachment pin 263 journalled at the outer end thereof. Pin 263 is secured to a vertical shaft 264 and pivotally connects the shaft to the outer end of beam 255. A connecting link 265 is affixed to the lower end of shaft 264 and is adapted to be connected to a welding unit supporting ring 272. Shaft 264 is movable about the axis of pin 263 in a plane perpendicular to the plane in which beam 255 is movable. The movement of shaft 264 is controlled by actuator 260 which includes an extensible piston rod 267 connected to shaft 264 by a connecting pin and bracket assembly 268. Compressed air is supplied to actuator 260 by air line 243. The flow of air to the actuator is regulated by an air control valve 270 interposed in line 243.

As is apparent from the foregoing description, the upper end of post 232 can be vertically positioned by hydraulic means, while member 240 and beam 255 are freely movable in parallel substantially horizontal planes about the axes of piston 234 and pin 256, respectively. Additionally, shaft 264 is movable about the axis of pin 263 in a substantially vertical plane parallel to the axis of beam 255, by actuator 260.

The welding unit of the second embodiment of the apparatus of the invention is shown in FIGS. 13 and 14, as designated by reference numeral 270. Unit 270 includes a movable carriage 271 and means for supporting the carriage for movement about two substantially vertically extending adjacent pipe sections to be welded together, and particularly two conductor pipe sections 20. The supporting means comprises a split ring 272 formed by two arcuate members 273 and 274 which are pivotally interconnected by a hinge 275.

Members 273 an 274 are adapted to be positioned about the lower of the two sections 20 to be welded together and releasably locked together by a quick-release latch 276. Ring 272 is secured to the lower of the two pipe sections 20 by two inwardly extending fixed support pins 278 attached to the underside of ring 272 by blocks 279, and an inwardly extending clamping bolt 280 attached to the lower portion of ring 272 by a block 281. Support pins 278 are mounted on member 273, while adjusting bolt 280 is mounted on opposing member 274. By this arrangement ring 272 can be disposed about the lower section 20, locked together by latch 276, and then clamped into the lower pipe section by adjusting bolt 280. If the horizontal distance between the weld metal depositing means and the base and deposited weld metal remains within acceptable limits, no compensating means, such as mechanism 157, is necessary.

Integrally affixed to the peripheries of members 273 and 274 is a support track 290 having an upper wheel receiving groove 291 and a lower wheel receiving groove 292 about the entire circumference thereof. Members 273 and 274 also define a load supporting surface 294 on the upper portions thereof, and a load guide surface 295 on the inner portions thereof. To connect ring 272 to positioning unit 225 during mounting and demounting of the welding unit about sections 20, member 273 is provided on the underside thereof with a connecting block 297 having a receiving slot 298 for accepting connecting link 265. Link 265 can be secured in slot 298 by a set screw 299. After ring 272 has been clamped onto the lower pipe section 20, set screw 299 can be loosened and arm 225 separated from ring 272. Once this is accomplished, the only connection between base 226 and welding unit 270 is constituted by cables 252, welding wire conduit 247, and flux supply conduit 251.

A carriage 271 is supported for movement about sections 20 on the upper surfaces of members 273 and 274. The carriage includes an open-bottomed base 305 to which is connected an articulated drive mechanism support. Such support includes a pair of plates 306 and 307, each of which rotatably support a pair of upper guide wheels 308 and a pair of lower guide wheels 309 which engage and move in guide tracks 291 and 292, respectively. Plates 306 and 307 are each individually pivotally attached to the underside of base 305 by a bolt 310 at the respective inner ends thereof, so that irregularities in the roundness of members 273 and 274 can be accommodated. The use of an articulated support for the drive mechanism also allows welding unit 270 to be used on tracks having different curvatures than that of ring 272, or on straight tracks, for example, when welding flat or slightly curved plates.

Carriage 271 also is provided with at least one main supporting wheel 320 mounted on the underside of base 305 and operating on support surface 294. In addition, at least one guide wheel 321 is rotatably connected to the underside of base 305 by a shaft 322, and engages guide surface 295 to assist in guiding and accurately positioning carriage 271 with respect to ring 272.

Disposed about the periphery of members 273 and 274 is a gear rack 330 which is engaged by a drive gear 331 rotatably mounted on plate 307 and driven by an electric drive unit 333. Unit 333 includes a speed control 335 which is immediately accessible to the operator so that the rate at which carriage 271 traverses ring 272 may be regulated easily. Power for unit 333 is received from base 226 through one of cables 252 and a junction box 337.

Mounted on the upper surface of base 305 is a means 340 for depositing weld metal, including a nozzle 341 from which protrudes the end of welding wire 238. Power for depositing means 340 is provided through one of cables 252 connected to the weld control unit 230 on base 226. Welding wire is supplied from reel 237 through wire conduit 247. A conventional wire feed mechanism 350 feeds wire 238 to nozzle 341 at a predetermined rate. Depositing means 340 also includes a means 343 for adjusting the vertical attitude of nozzle 341. Adjusting means 343 includes a handle 344 and a locking ring 345.

Attached to and movable with depositing means 340 is a means 347 for depositing welding flux. Such means include a tube 348 positioned above nozzle 341 and terminating just above wire 238 as the wire extends from the nozzle. A bracket 349 fixedly attaches flux depositing means 347 to nozzle 341. Flux is supplied from flux drum 231 on base 226 through flux supply conduit 251. The flux can be moved from drum 231 to tube 348 by any suitable pneumatic carrier, such as compressed air.

A means for adjusting the horizontal position of nozzle 341 is not shown in FIGS. 13 and 14, but can be provided if desired.

The horizontal distance between welding wire 238 and the base and deposited weld metal is kept constant within the limits required as explained above. Therefore, once the welding power level is established, the physical characteristics of the weld metal beads are controlled by regulating the velocity of depositing means 340.

Desirably welding unit 270 includes two carriages 271 and associated elements, although only one carriage is shown in the drawings, so that the welding operation may be completed as quickly as possible.

Figure 16:
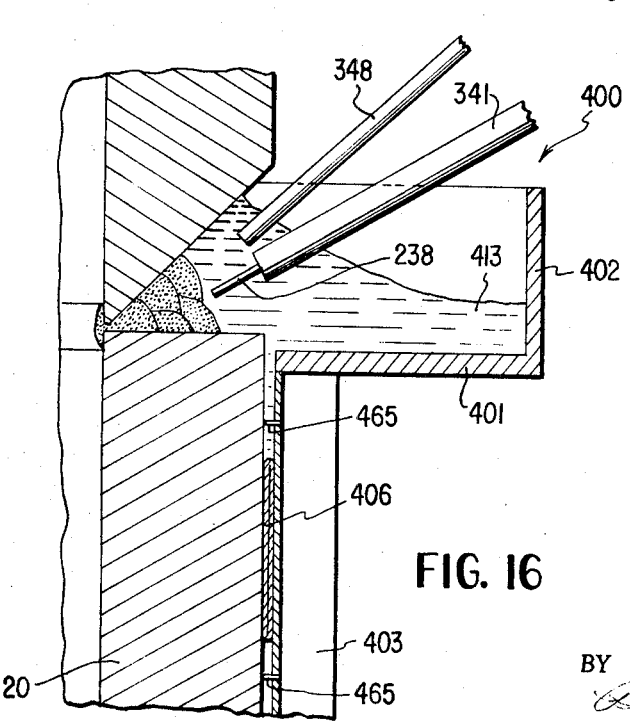
FIG. 16 is a sectional view of a portion of the welding trough shown in FIG. 15.
Figure 15:
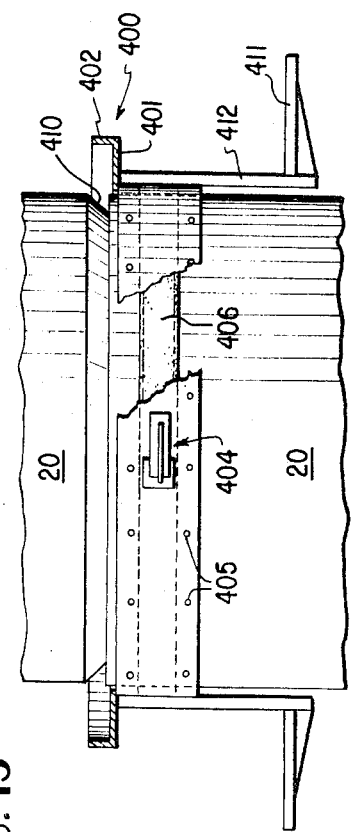
FIG. 15 is an elevational view, partially in cross section, of the welding trough of this invention as positioned about two substantially vertically extending pipe sections.

Illustrated in FIGS. 15 and 16 is a flux dam 400 which is adapted to be used with the apparatus shown in FIGS. 12–14. Flux dam 400 comprises a flux trough 401 having an outer wall 402 and a mounting band 403 having a quick-release fastener 404. Band 403 has a plurality of inwardly facing pins 405 disposed in two rows about the interior thereof. Between the two rows of pins 405 is interposed an asbestos seal 406 to prevent any liquid flux from escaping inwardly from flux trough 402 and running down the outside of the lower pipe section 20. Flux dam 400 is positioned about the lower pipe section adjacent a welding space 401 defined between sections 20 to contain a pool of liquified flux used in a welding operation which utilizes the submerged arc technique. Flux dam 400 provides an added advantageous feature by incorporating a plurality of pads 411 for aligning ring 272. Pads 411 are individually connected to band 403 by rods 412. Rods 412 are of such length as to space pads 411 a precise distance from welding space 410. Flux dam 400 is installed with flux trough 401 positioned immediately beneath welding space 410, and ring 272 is thereafter positioned on pads 411 by the use of positioning unit 225 and secured to the lower section 20 in the manner described above. Ring 277 may thus be quickly and precisely positioned about the lower pipe section.

The operation of flux dam 400 is illustrated in FIG. 16. Nozzle 341 presents welding wire 238 to sections 20 within space 410, and upon application of electrical power thereto submerged arc welding occurs in the normal manner. In accordance with this technique, the electric arc struck between weld wire 238 and the base and deposited weld metal is kept submerged in a bath of liquid flux 413. The flux is provided in granular form through tube 348 and melts upon exposure to the high temperatures generated by the welding arc. Flux dam 400 contains the liquid flux and allows much less flux to be used by providing a confined pool between weld space 410 and outer wall 402. Liquid flux 413 is prevented from running out between trough 401 and the lower pipe section 20 by asbestos gasket 406. The flux is simply removed manually from flux trough 401 upon cooling.

The operation of the second embodiment of the apparatus of the invention is very similar to that of the first embodiment. Arm 227 is connected to ring 272, by connecting link 265 and receiving slot 298, and is attached thereto by tightening set screw 299. To position ring 272 about the lower pipe section 20, arm 227 is then elevated and rotated, and shaft 264 pivoted as necessary, until ring 272 is properly positioned and aligned. Thereupon, the ring is clamped onto the lower pipe section by connecting members 273 and 274 together by latch 276, and then tightening bolt 280. Arm 227 can then be disconnected from ring 272 by loosening set screw 299, and pulling link 265 from slot 298.

The alignment of ring 272 is greatly facilitated if flux dam 400 is first installed about the lower section 20 as described above. This being first accomplished, ring 272 is simply placed on pads 411 by arm 227, and the ring then clamped onto the lower pipe section as explained above.

Welding unit 270 is necessarily relatively large, heavy, cumbersome, and rather delicate. Moreover, this welding unit must be mounted and demounted about pipe sections 20 regularly every few hours for long periods of time. Thus, positioning unit 225 forms an important part of the invention because it reduces the time and effort necessary for mounting and demounting the welding unit, and reduces to a minimum the possibility of damage to the equipment.

It is to be understood that while preferred forms of the invention are herein illustrated and described, the invention is not to be limited to such forms but is to be limited solely by the scope of the appended claims.

I claim:

1. A method for welding a pair of vertically extending pipe sections together by the use of a weld metal depositing means, each said pipe section having a wall defining an inner surface and outer surface, said method comprising:

placing said pipe sections in substantially vertically extending relationship with one end of one said section disposed adjacent one end of the other said section to form a weld space between said adjacent one ends, establishing at the beginning of each welding pass a predetermined separation and attitude between said weld metal depositing means and the base metal or previously deposited weld metal along with a predetermined weld metal deposition rate by said weld metal depositing means, moving said weld metal depositing means about said sections to deposit weld metal in said weld space in at least one welding pass around said sections beginning at said inner surfaces and working progressively therearound and outwardly to fill said weld space with weld metal, while maintaining constant said predetermined separation and attitude and said predetermined weld metal deposition rate irrespective of environmentally induced movements of said pipe sections and dimensional inaccuracies in said pipe sections or said weld space, and controlling the physical characteristics of said deposited weld metal by regulating only the rate of movement of said weld metal depositing means along said weld space about said pipe sections.

2. A method as recited in claim 1 further comprising the initial step of forming a bevel at said one end of at least one said section, said bevel extending across said wall of said one section from said inner surface to said outer surface thereof and opening outwardly.

3. A method as recited in claim 2 wherein said adjacent one ends are placed onto contact with one another prior to depositing weld metal in said weld space.

4. A method as recited in claim 1 further comprising the initial steps of attaching a backing strip to said one end of one said section and inserting said backing strip into the other said section when said one ends are placed adjacent each other.

* * * * *